(12) United States Patent
Lin et al.

(10) Patent No.: US 12,288,995 B2
(45) Date of Patent: Apr. 29, 2025

(54) WIRELESS CHARGING APPARATUS, METHOD AND SYSTEM

(71) Applicant: GUANGDONG OPPO MOBILE TELECOMMUNICATIONS CORP., LTD., Dongguan (CN)

(72) Inventors: Shangbo Lin, Dongguan (CN); Shiming Wan, Dongguan (CN); Jun Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 703 days.

(21) Appl. No.: 17/559,905

(22) Filed: Dec. 22, 2021

(65) Prior Publication Data
US 2022/0115915 A1  Apr. 14, 2022

Related U.S. Application Data

(63) Continuation of application No. PCT/CN2020/100807, filed on Jul. 8, 2020.

(30) Foreign Application Priority Data

Jul. 19, 2019  (CN) .......................... 201910653698.X (51) Int. Cl.
H02J 7/00    (2006.01)
H02J 50/12   (2016.01)
H02J 50/80   (2016.01)

(52) U.S. Cl.
CPC .......... *H02J 50/12* (2016.02); *H02J 7/00034* (2020.01); *H02J 50/80* (2016.02)

(58) Field of Classification Search
CPC ......... H02J 50/12; H02J 50/80; H02J 7/00034
See application file for complete search history.

(56) References Cited

U.S. PATENT DOCUMENTS

2017/0288447 A1  10/2017 Guibene et al.
2019/0190321 A1*  6/2019 Wan ...................... H02J 50/80

FOREIGN PATENT DOCUMENTS

CN  101986509 A   3/2011
CN  107332590 A   11/2017
(Continued)

OTHER PUBLICATIONS

International Search Report and Written Opinion dated Oct. 13, 2020 in International Application No. PCT/CN2020/100807. English translation is attached.

(Continued)

*Primary Examiner* — Robert Grant
(74) *Attorney, Agent, or Firm* — Sheppard, Mullin, Richter & Hampton LLP (57) ABSTRACT

Disclosed are a wireless charging apparatus, a wireless charging method, and a wireless charging system. The wireless charging apparatus includes: a charging interface; a wireless transmitting circuit configured to convert electric energy outputted from a power supply apparatus into an electromagnetic signal and transmit the electromagnetic signal to wirelessly charge a device to be charged; and a control module configured to determine a wireless charging mode to be adopted as a first wireless charging mode or a second wireless charging mode through communication between the wireless transmitting circuit and the device to be charged, periodically detect whether a condition for exiting the first wireless charging mode has occurred when in the first wireless charging mode, and adjust a current wireless charging mode to the second wireless charging mode in response to detecting that the condition for exiting the first wireless charging mode has occurred.

20 Claims, 4 Drawing Sheets

(56) References Cited

FOREIGN PATENT DOCUMENTS

| | | |
|---|---|---|
| CN | 107666172 A | 2/2018 |
| CN | 108242836 A | 7/2018 |
| CN | 108521153 A | 9/2018 |
| CN | 109193889 A | 1/2019 |
| CN | 109314396 A | 2/2019 |
| CN | 109450032 A | 3/2019 |
| CN | 109728652 A | 5/2019 |
| EP | 3416262 A1 | 12/2018 |
| EP | 3493361 A1 | 6/2019 |

OTHER PUBLICATIONS

First Office Action from corresponding Chinese Application No. 201910653698.X, dated Jan. 5, 2022. English translation attached.
Extended European Search Report dated Jul. 12, 2022 received in European Patent Application No. EP 20844960.3.
Intent to Grant from corresponding Chinese Application No. 201910653698.X, dated May 10, 2022. English translation attached.

\* cited by examiner

WIRELESS CHARGING APPARATUS, METHOD AND SYSTEM

CROSS-REFERENCE TO RELATED APPLICATIONS

The present application is a continuation of International Application No. PCT/CN2020/100807 filed on Jul. 8, 2020, which claims priority to Chinese patent application No. 201910653698.X filed on Jul. 19, 2019, the entire contents of which are incorporated herein by reference.

FIELD

The present disclosure relates to the field of wireless charging technology, and in particular, relates to a wireless charging apparatus, a wireless charging method and a wireless charging system.

BACKGROUND

With the popularization of the wireless charging technology, more and more electronic devices support wireless charging or wireless transmission functions. However, the current wireless charging technology, due to the unreasonable control process design, especially the unreasonable charging control process of a wireless charging base that connects a power adapter and a device to be charged, can hardly quickly coordinate reasonable adaptation of a charging mode between the wireless charging base and the power adapter and a charging mode between the wireless charging base and the device to be charged, which causes problems such as a slow speed of wireless charging and severe heat generation.

The above information disclosed in the background part is only used to enhance the understanding of the background of the present disclosure, and therefore it may include information that does not constitute prior art known to those of ordinary skill in the art.

SUMMARY

The present disclosure provides a wireless charging apparatus, a wireless charging method, and a wireless charging system.

Other features and advantages of the present disclosure will become apparent through the following detailed description, or be partly learned through the practice of the present disclosure.

According to an aspect of the present disclosure, a wireless charging apparatus is provided. The wireless charging apparatus includes: a charging interface; a wireless transmitting circuit configured to convert electric energy received through the charging interface and outputted from a power supply apparatus into an electromagnetic signal and transmit the electromagnetic signal to wirelessly charge a device to be charged; and a control module electrically connected to the charging interface and the wireless transmitting circuit respectively and configured to determine a wireless charging mode to be adopted through communication between the wireless transmitting circuit and the device to be charged. The wireless charging mode is a first wireless charging mode or a second wireless charging mode, and an output power of the wireless transmitting circuit in the first wireless charging mode is greater than an output power of the wireless transmitting circuit in the second wireless charging mode. The control module is further configured to, in the first wireless charging mode, periodically detect whether a condition for exiting the first wireless charging mode has occurred, and adjust a current wireless charging mode to the second wireless charging mode in response to detecting that the condition for exiting the first wireless charging mode has occurred.

According to an embodiment of the present disclosure, the control module is further configured to request the power supply apparatus to operate in the first charging mode in response to receiving a first wireless charging mode request transmitted from the device to be charged and when the power supply apparatus is of a first type or of a second type. A maximum output power of the power supply apparatus of the first type is greater than a maximum output power of the power supply device of the second type; and when the power supply apparatus operates in the first charging mode, and the electric energy outputted from the power supply apparatus has a power greater than or equal to a charging power required for the first wireless charging mode.

According to an embodiment of the present disclosure, the control module is further configured to detect whether a current port of the charging interface is a standard downlink port; in response to detecting that the current port is not the standard downlink port, turn on a load connected between the power supply apparatus and the control module through a load control signal, and transmit a first charging mode request to the power supply apparatus; determine the power supply apparatus to be of a third type when no first charging mode response transmitted from the power supply apparatus is received within a preset time period; and determine the power supply apparatus to be of the first type or of the second type in accordance with a received information header of data frames transmitted from the power supply apparatus when the first charging mode response is received within the preset time period. Both the maximum output power of the power supply apparatus of the first type and the maximum output power of the power supply apparatus of the second type are greater than a maximum output power of the power supply apparatus of the third type.

According to an embodiment of the present disclosure, the first charging mode request includes requesting the power supply apparatus to provide an output current greater than a first preset current value and requesting transmission of a first preset number of square wave signals to the power supply apparatus.

According to an embodiment of the present disclosure, the first charging mode response includes: a current of the load being greater than the first preset current value and rising edge interrupt signals of a quantity greater than a preset second number being received.

According to an embodiment of the present disclosure, the apparatus further includes: a voltage converting module electrically connected to the wireless transmitting circuit, the control module, and the charging interface respectively. In the first wireless charging mode, the voltage converting module is activated by a second enable signal transmitted from the control signal; and the voltage converting module is configured to adjust an output voltage provided to the wireless transmitting circuit in accordance with a voltage adjustment signal transmitted from the control module.

According to an embodiment of the present disclosure, the control module is further configured to periodically receive a voltage adjustment value fed back by the device to be charged through the wireless transmitting circuit; determine, in accordance with the voltage adjustment value, an output voltage needed to be adjusted; and transmit the output voltage needed to be adjusted to the voltage converting module through the voltage adjustment signal.

According to an embodiment of the present disclosure, the control module is further configured to turn off the voltage converting module through the second enable signal after adjusting the current wireless charging mode to the second wireless charging mode, and reset the power supply apparatus through communication with the power supply apparatus to cause the power supply apparatus to be set in the second charging mode.

According to an embodiment of the present disclosure, the condition for exiting the first wireless charging mode includes at least one of: a disconnection signal being received, a battery of the device to be charged being fully charged, or a charging current of the device to be charged being smaller than a second preset current value.

According to another aspect of the present disclosure, a wireless charging method applicable to a wireless charging apparatus is provided. The wireless charging method includes: determining a type of a power supply apparatus through communication between a charging interface in the wireless charging apparatus and the power supply apparatus; and determining a wireless charging mode to be adopted through communication between a wireless transmitting circuit in the wireless charging apparatus and a device to be charged, where the wireless charging mode is a first wireless charging mode or a second wireless charging mode, and an output power of the wireless transmitting circuit in the first wireless charging mode is greater than an output power of the wireless transmitting circuit in the second wireless charging mode; when a current wireless charging mode is determined as the first wireless charging mode, periodically detecting whether a condition for exiting the first wireless charging mode has occurred; and adjusting the current wireless charging mode to the second wireless charging mode in response to detecting that the condition for exiting the first wireless charging mode has occurred.

According to an embodiment of the present disclosure, the method further includes: requesting the power supply apparatus to operate in the first charging mode when a first wireless charging mode request transmitted from the device to be charged is received, and the power supply apparatus is of a first type or of a second type, where a maximum output power of the power supply apparatus of the first type is greater than a maximum output power of the power supply device of the second type; and when the power supply apparatus operates in the first charging mode, electric energy outputted from the power supply apparatus has a power greater than or equal to a charging power required for the first wireless charging mode.

According to an embodiment of the present disclosure, said determining the type of a power supply apparatus through communication between the charging interface in the wireless charging apparatus and the power supply apparatus further includes: detecting whether a current port of the charging interface is a standard downlink port; in response to detecting that the current port is not the standard downlink port, turning on a load connected between the power supply apparatus and the control module through a load control signal, and transmitting a first charging mode request to the power supply apparatus; determining the type of the power supply apparatus as a third type when no first charging mode response transmitted from the power supply apparatus is received within a preset time period; and determining the type of the power supply apparatus as the first type or the second type in accordance with a received information header of data frames transmitted from the power supply apparatus when the first charging mode response is received within the preset time period. Both the maximum output power of the power supply apparatus of the first type and the maximum output power of the power supply apparatus of the second type are greater than a maximum output power of the power supply apparatus of the third type.

According to an embodiment of the present disclosure, the first charging mode request includes requesting the power supply apparatus to provide an output current greater than a first preset current value and requesting transmission of a first preset number of square wave signals to the power supply apparatus.

According to an embodiment of the present disclosure, the first charging mode response includes: a current of the load being greater than the first preset current value and rising edge interrupt signals of a quantity greater than a second preset number being received.

According to an embodiment of the present disclosure, the method further includes: when the current wireless charging mode is determined as the first wireless charging mode, activating a voltage converting module in the wireless charging apparatus by transmitting a second enable signal to the voltage converting module.

According to an embodiment of the present disclosure, the method further includes: periodically receiving a voltage adjustment value fed back by the device to be charged through the wireless transmitting circuit; determining, in accordance with the voltage adjustment value, an output voltage needed to be adjusted; and transmitting the output voltage needed to be adjusted to the voltage converting module through a voltage adjustment signal.

According to an embodiment of the present disclosure, the method includes: after adjusting the current wireless charging mode to the second wireless charging mode, turning off the voltage converting module through the second enable signal, and resetting the power supply apparatus through communication with the power supply apparatus to cause the power supply apparatus to be set in the second charging mode.

According to an embodiment of the present disclosure, the condition for exiting the first wireless charging mode includes at least one of: a disconnection signal being received, a battery of the device to be charged being fully charged, or a charging current of the device to be charged being smaller than a second preset current value.

According to yet another aspect of the present disclosure, a wireless charging system is provided. The wireless charging system includes: any one of the wireless charging apparatuses described above, a device to be charged and a power supply apparatuses. The wireless charging apparatus is configured to convert inputted electric energy into an electromagnetic signal and transmit the electromagnetic signal to wirelessly charge the device to be charged; and the power supply apparatus is configured to provide the inputted electric energy to the wireless charging apparatus.

According to the wireless charging apparatus provided by the embodiments of the present disclosure, through a control process, the adaptation of the charging mode between the device to be charged and the power supply device can be quickly coordinated to cause the device to be charged to quickly enter a fast wireless charging mode (such as the above-mentioned first wireless charging mode) and increase the charging speed of the device to be charged. In addition, in the fast wireless charging mode, whether conditions for exiting the fast wireless charging mode have occurred are detected periodically. Once these conditions occur, a standard wireless charging mode is immediately returned to, thereby avoiding a waste of electric energy due to a high output power.

It should be understood that the above general description and the following detailed description are merely exemplary, and cannot limit the present disclosure.

BRIEF DESCRIPTION OF DRAWINGS

The above and other objectives, features and advantages of the present disclosure will become more apparent by describing the exemplary embodiments in detail with reference to the accompanying drawings.

DESCRIPTION OF EMBODIMENTS

Exemplary embodiments will be described more comprehensively with reference to the accompanying drawings. However, the exemplary embodiments can be implemented in various forms, and should not be construed as being limited to the examples set forth herein. On the contrary, these embodiments are provided to make the disclosure more comprehensive and complete, and comprehensively delivery the idea of the exemplary embodiments to those skilled in the art. The accompanying drawings are merely schematic illustrations of the disclosure, and are not necessarily drawn to scale. The same reference numerals in the drawings represent the same or similar parts, and thus their repeated descriptions will be omitted.

In addition, the described features, structures or characteristics can be combined in one or more embodiments in any appropriate manner. In the following description, numerous specific details are provided to give a full understanding of the embodiments of the present disclosure. However, those skilled in the art will appreciate that the technical solutions of the present disclosure may be practiced without one or more of the specific details, or with other methods, components, devices, steps, and the like. In other instances, well-known structures, methods, devices, implementations, or operations are not shown or described in detail to avoid obscuring aspects of the present disclosure.

In this disclosure, unless otherwise expressly specified and defined, terms "connect", "connected" and other terms shall be understood broadly. For example, a connection may be a fixed connection, a removable connection, or an integrated connection, may be an electrical connection or a communication connection, and may be a direct connection, or an indirect connection through an intermedium. For those of ordinary skills in the art, the specific meanings of the above-mentioned terms in the disclosure could be understood according to specific situations.

Furthermore, in the description of the present disclosure, terms "first" and "second" are only for description, and cannot be understood as explicitly or implicitly indicating relative importance or implicitly indicating the number of technical features referred to. Therefore, features defined by terms "first", "second", and the like can explicitly or implicitly include at least one of the features.

In the process of wireless charging, a power supply apparatus (such as an adapter) is generally connected to a wireless charging apparatus (such as a wireless charging base), and an output power of the power supply apparatus is wirelessly (such as an electromagnetic signal or an electromagnetic wave) transmitted to a device to be charged through the wireless charging apparatus, to wirelessly charge the device to be charged.

According to different principles of wireless charging, wireless charging methods are mainly divided into three methods: magnetic coupling (or electromagnetic induction), magnetic resonance, and radio waves. At present, mainstream wireless charging standards include the QI standard, Power Matters Alliance (PMA) standard, and Alliance for Wireless Power (A4WP). Both the QI standard and the PMA standard use magnetic coupling for wireless charging. The A4WP standard uses magnetic resonance for wireless charging.

Figure 1:
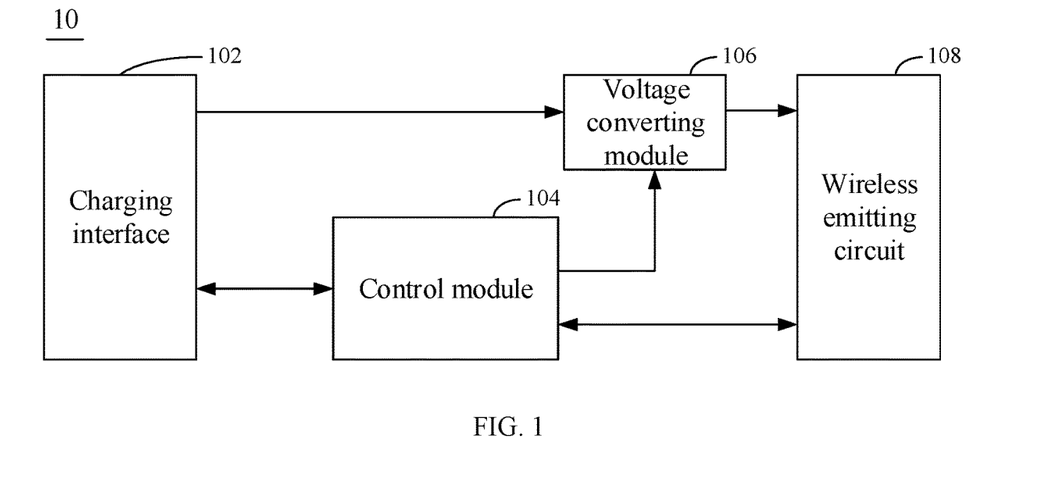
FIG. 1 illustrates a block diagram of a wireless charging apparatus according to an exemplary embodiment.

FIG. 1 illustrates a block diagram of a wireless charging apparatus according to an exemplary embodiment.

A wireless charging apparatus 10 illustrated in FIG. 1 may be, for example, a wireless charging base. Referring to FIG. 1, the wireless charging apparatus 10 includes: a charging interface 102, a control module 104 and a wireless transmitting circuit 108.

Figure 2:
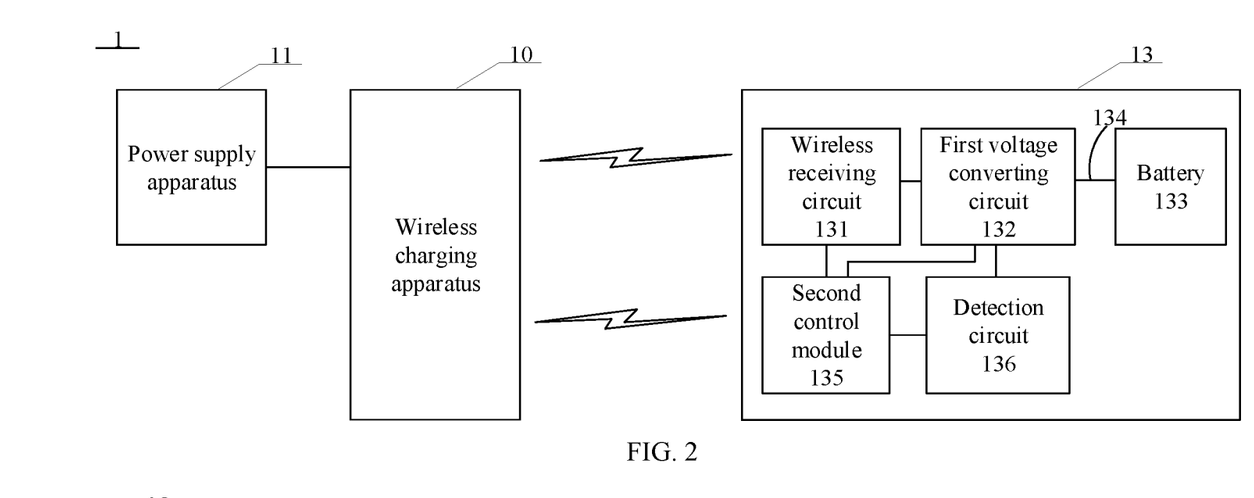
FIG. 2 illustrates a schematic structural diagram of a wireless charging system according to an exemplary embodiment.

FIG. 2 illustrates a schematic structural diagram of a wireless charging system according to an exemplary embodiment. As illustrated in FIG. 2, the wireless charging system 1 includes: a power supply apparatus 11, a wireless charging apparatus 10 and a device to be charged 13. It should be noted that, in order to simplify the drawings, the wireless charging apparatus 10 in FIG. 2 does not show a specific structure. The specific structure of the wireless charging apparatus 10 can be seen in FIG. 1.

Hereinafter, the wireless charging apparatus 10 will be described in detail with reference to FIG. 1 and FIG. 2 in combination.

The wireless charging apparatus 10 is connected to the power supply apparatus 11 (such as a power adapter, a mobile power supply, etc.) through the charging interface 102, and receives electric energy outputted from the power supply apparatus 11.

The charging interface 102 may be, for example, a USB 2.0 interface, a Micro USB interface or a USB TYPE-C interface. In some embodiments, the charging interface 102 may also be a lightning interface, or a parallel interface or series interface of any other type that can be used for charging.

The wireless transmitting circuit 108 is configured to convert the electric energy outputted from the power supply apparatus 11 into an electromagnetic signal (or an electromagnetic wave) and transmit the electromagnetic signal to wirelessly charge for the device to be charged 13 (such as a terminal device). For example, the wireless transmitting circuit 108 may include: a wireless transmitting drive circuit and an transmitting coil (or an transmitting antenna). The wireless transmitting drive circuit is configured to convert a direct current outputted from the power supply apparatus 11 into a high-frequency alternating current, convert the high-frequency alternating current into an electromagnetic signal (or an electromagnetic wave) through the transmitting coil or the transmitting antenna, and transmit the electromagnetic signal.

The device to be charged 13, for example, may be a terminal or a communication terminal, the terminal or the communication terminal includes, but is not limited to, an apparatus configured to receive or transmit signals through a wired line connection, such as public switched telephone network (PTSN), a digital subscriber line (DSL), digital cables, and a direct cable connection, and/or another data connection/network, and/or for example, cellular networks, wireless local area networks (WLAN), digital television networks such as digital video broadcasting handheld (DVVB-H), satellite networks, amplitude modulation-frequency modulation (AM-FM) broadcasting transmitters, and/or a wireless interface of another terminal. Communication terminals configured to communicate through wireless interfaces may be referred as "wireless communication terminals", "wireless terminals", and/or "mobile terminals". Examples of the mobile terminals include, but not limited to, satellite or cellular phones; personal communication system (PCS) terminals that may combine cellular radiotelephone with data processing, fax, and data communication capabilities; Personal Digital Assistants (PDAs) that may include radiotelephones, pagers, Internet/Intranet access, Web browser, memo pads, calendars, and/or global positioning system (GPS) receivers; and conventional laptop and/or palmtop receivers or other electronic devices including radiotelephone transceiver. Further, the terminals may also include, are but not limited to, chargeable electronic devices with a charging function, such as e-book readers, smart wearable devices, mobile power supplies (such as a power bank, a travel charger), electronic cigarettes, a wireless mouse, a wireless keyboard, wireless headsets, Bluetooth speakers, etc.

The control module 104 may be implemented by, for example, a Micro Control Unit (MCU). The control module 104 is electrically connected to the charging interface 102 and the wireless transmitting circuit 108 respectively, and is configured to communicate with the device to be charged 13 and the power supply apparatus 11 in the process of the wireless charging apparatus 10 wirelessly charging the device to be charged 13.

The wireless charging apparatus 10 (the control module 104) can communicate with the power supply apparatus 11, for example, through the charging interface 102, without the need to set up an additional communication interface or other wireless communication modules, which can simplify the implementation of the wireless charging apparatus 10. For example, the charging interface 102 is a USB interface, and the wireless charging apparatus 10 (the control module 104) and the power supply apparatus 11 may communicate with each other based on a data line (such as D+ and/or D− line) in the USB interface. For another example, the charging interface 102 is a USB interface (such as a USB TYPE-C interface) that supports a power delivery (PD) communication protocol, and the wireless charging apparatus 10 (the control module 104) and the power supply apparatus 11 can communicate with each other based on the PD communication protocol.

Further, the wireless charging apparatus 10 (the control module 104) may be in communication connection with the power supply apparatus through other communication manners besides the charging interface 102. For example, the wireless charging apparatus 10 (the control module 104) may communicate with the power supply apparatus 11 in a wireless manner, such as Near Field Communication (NFC), etc.

The control module 104 can communicate with the device to be charged 13 in a wireless manner. The present disclosure does not limit a communication mode and a communication sequence between the wireless charging apparatus 10 and the device to be charged 13. For example, it may be one-way wireless communication or two-way wireless communication. It may be a communication initiated by the device to be charged 13 or a communication initiated by the wireless charging apparatus 10. In the wireless communication process, the device to be charged 13 can couple the information to be transmitted to a receiving coil of a wireless receiving circuit 131, so as to transmit the information to be transmitted to the transmitting coil of the wireless transmitting circuit 108, and then the wireless transmitting circuit 108 transmits the decoupled information to the control module 104. Conversely, in the two-way communication, the wireless charging apparatus 10 can couple the information to be transmitted to the transmitting coil of the wireless transmitting circuit 108, so as to transmit the information to be transmitted to the receiving coil of the wireless receiving circuit 131 in the device to be charged 13, and then the receiving coil of the wireless receiving circuit 131 in the device to be charged 13 decouples the information to be transmitted.

Alternatively, the wireless charging apparatus 10 may communicate with the device to be charged 13 through at least one of Bluetooth, WiFi, mobile cellular network communication (such as 2G, 3G, 4G, or 5G), wireless communication (such as IEEE 802.11, 802.15 (WPANs), 802.16 (WiMAX), 802.20, etc.), short distance wireless communication based on high-frequency antenna (such as 60 GHz), optical communication (such as infrared communication), ultrasonic communication, ultra wideband (UMB) communication, and other communication manners. It should be understood that, when communicating with the above-mentioned communication manners, the device to be charged 13 and the wireless charging apparatus 10 further include a corresponding communication module, e.g., at least one of a Bluetooth communication module, a WiFi communication module, a 2G/3G/4G/5G mobile communication module, a high-frequency antenna, an optical communication module, an ultrasonic communication module, an ultra wideband communication module, etc. It should be understood that standards applicable to the wireless communication described above include past and existing standards, and also include future versions of these standards and future standards if not departing from the scope of the disclosure. Communicating through the above-mentioned wireless communication manners, the reliability of the communication may be improved, thereby improving the safety of charging. Compared with the communication manner in which the feedback information is coupled to the receiving coil of the wireless receiving circuit 131 through signal modulation for communication in the related art (such as Qi standard), the reliability of the communication may be improved, and the voltage ripples caused by adopting signal coupling communication, which affect the voltage processing of a first voltage converting circuit in the device to be charged 13, may be avoided. Further, regarding voltage ripples of the wireless receiving coil during outputting, if the ripples are not processed effectively, safety issues of the wireless charging may be caused, thereby having certain safety risks. Communicating through the above-mentioned wireless communication manners, the voltage ripples can be eliminated, thereby omitting circuits for processing the voltage ripples, reducing the complexity of a charging circuit of the device to be charged 13, improving the charging efficiency, saving the space for circuit setting, and reducing the cost.

Figure 3:
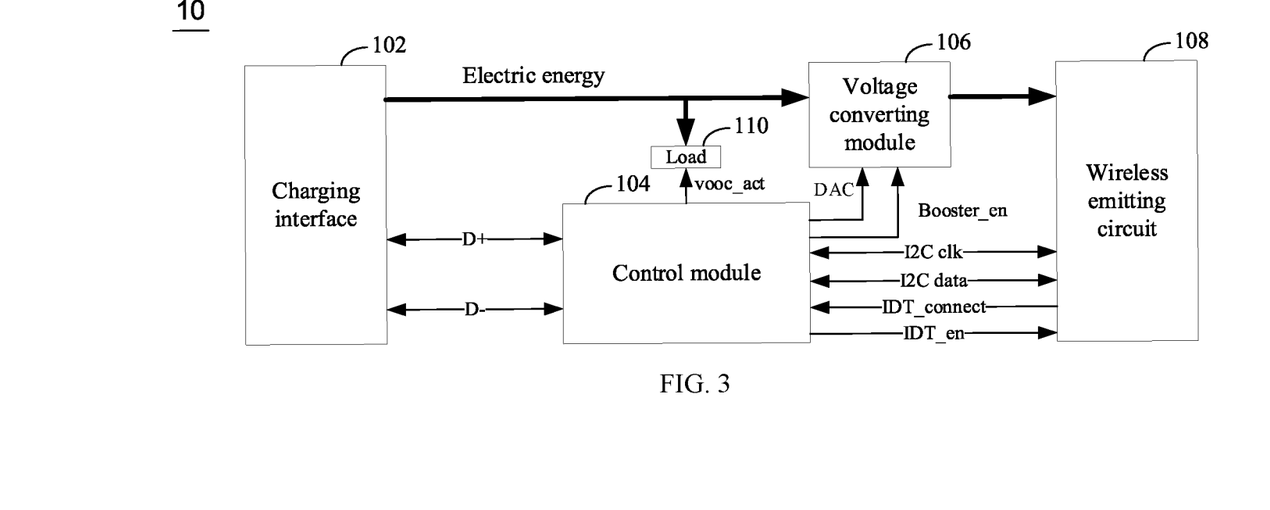
FIG. 3 illustrates a block diagram of a wireless charging apparatus according to an exemplary embodiment.

FIG. 3 illustrates a block diagram of a wireless charging apparatus according to an exemplary embodiment. As illustrated in FIG. 3, for example, the charging interface 102 is implemented as a USB connector, the control module 104 is implemented as a microcontroller, and the wireless transmitting circuit 108 is implemented as an transmitting chip. Among them, the charging interface 102 and the control module 104 communicate data through the data line D+/D−. In addition, the control module 104 is also electrically connected to a power line of the charging interface 102, that is, the control module 104 is powered by the charging interface 102. Every time the wireless charging apparatus 10 is powered on again, the control module 104 will rerun. The control module 104 and the wireless transmitting circuit 108 are connected through a I2C clk pin, a I2C data pin, a IDT_connect pin and a IDT_en pin. The I2C clk pin is configured to transmit clock signals, the I2C data pin is configured to transmit data, and both the IDT_connect pin and the IDT_en pin are signal pins configured to transmit signals.

How the control module 104 in the wireless charging apparatus 10 controls the wireless charging process is described below with reference to FIG. 1 to FIG. 3.

When electric energy provided by the power supply apparatus 11 is received (that is, the wireless charging apparatus 10 is powered on), the control module 104 is used to transmit a first enable signal (for example, a signal transmitted through the IDT_en pin in FIG. 3) to the wireless transmitting circuit 108 to activate the wireless transmitting circuit 108. Subsequently, the control module 104 communicates with the power supply apparatus 11 through the charging interface 102 (for example, communicates data through the data line D+/D− illustrated in FIG. 3) to determine a type of the power supply apparatus 11; and in response to receiving a connection notification signal (for example, a signal that is set to high level and is transmitted through the IDT_connect pin illustrated in FIG. 3 from the wireless transmitting circuit 108) transmitted from the wireless transmitting circuit 108, communicates with the device to be charged 13 through the wireless transmitting circuit 108 (for example, communication through data transmitted through the I2C data pin illustrated in FIG. 3) to determine a current wireless charging mode.

The wireless charging mode may include, for example, a first wireless charging mode and a second wireless charging mode. The first wireless charging mode may be a fast wireless charging mode. The second wireless charging mode may be referred to as a common wireless charging mode. A speed of the wireless charging apparatus 10 for charging the device to be charged 13 in the first wireless charging mode is faster than a speed of the wireless charging apparatus 10 for charging the device to be charged 13 in the second wireless charging mode. In other words, compared to the wireless charging apparatus 10 operating in the second wireless charging mode, the wireless charging apparatus 10 operating in the first wireless charging mode takes less time to fully charge a battery in the device to be charged 13 with the same capacity.

The common wireless charging mode may refer to a wireless charging mode in which the wireless charging apparatus 10 has a relatively small transmitting power (usually smaller than 15 W, and the commonly used transmitting power is 5 W or 10 W). For example, it may be a traditional wireless charging mode based on the QI standard, the PMA standard, or the A4WP standard. In the common wireless charging mode, it usually takes several hours to fully charge a relatively large-capacity battery (such as a battery having a capacity of 3000 mAh).

In the fast wireless charging mode, the transmitting power of the wireless charging apparatus 10 is relatively high (usually greater than or equal to 15 W, e.g., 15 W to 25 W). Compared with the common wireless charging mode, the charging time required for the wireless charging apparatus 10 to fully charge the battery of the same capacity in the fast wireless charging mode can be significantly shortened and the charging speed is faster.

After the wireless charging apparatus 10 is activated, it operates in the second wireless charging mode by default. The control module 104 periodically receives instructions transmitted from the device to be charged 13, and these instructions are configured for determining whether the current wireless charging mode needs to be adjusted, for example, whether the current second wireless charging mode needs to be adjusted to the first wireless charging mode.

The types of the power supply apparatus 11 are divided in accordance with a maximum power that the power supply apparatus 11 can output, and may include: a first type, a second type, and a third type. The power supply apparatus 11 of the first type has the highest maximum output power, for example, 50 W (10V/5 A); the power supply apparatus 11 of the second type has the second highest maximum output power, for example, 20 W (5V/4 A); and the power supply apparatus of the third type has the lowest maximum output power, for example, 5 W or 10 W.

When the power supply apparatuses 11 of the three types provide electronic energy to the wireless charging apparatus 10, it may also include two charging modes: a first charging mode and a second charging mode. The first charging mode may be a fast charging mode, and the second charging mode may be a common charging mode.

The common charging mode refers to that the power supply apparatus 11 outputs a relatively small current value (usually smaller than 2.5 A) or outputs a relatively small power (usually smaller than 15 W, e.g., 5 W/10 W) to the wireless charging apparatus 10. Compared with the common charging mode, the output power of the power supply apparatus 11 in the fast charging mode is higher, such as the aforementioned 20 W, 50 W, etc.

The power supply apparatus 11 of the first type and the power supply apparatus 11 of the second type can each support the first charging mode and the second charging mode, while the power supply apparatus 11 of the third type only supports the second charging mode, that is, the common charging mode.

It should be noted that the wireless charging mode adopted between the wireless charging apparatus 10 and the device to be charged 13 needs to match the charging mode adopted between the wireless charging apparatus 10 and the power supply apparatus 11. For example, the power supply apparatus 11, when operating in the first charging mode, shall output electric energy that has a power greater than or equal to a charging power required by the wireless charging apparatus in the first wireless charging mode. If the device to be charged 13 requests the aforementioned first wireless charging mode, the device to be charged 13 first needs to communicate with the wireless charging apparatus 10 to determine whether the power supply apparatus 11 is of the first type or of the second type.

In addition, when the control module 104 has received a first wireless charging request instruction transmitted from the device to be charged 13, and when the power supply apparatus 11 is of the first type or of the second type, the control module 104 requests the power supply apparatus 11 to operate in the first charging mode, that is, the output voltage of the power supply apparatus 11 be increased.

Through the above control process, the device to be charged 13 can quickly enter the first wireless charging mode (i.e., the fast wireless charging mode) after the wireless charging starts, thereby increasing the charging speed of the device to be charged 13.

During the wireless charging process, the control module 104 will also periodically detect whether a condition for exiting the first wireless charging mode has occurred when in the first wireless charging mode; and in response to detecting that the condition for exiting the first wireless charging mode has occurred, adjust the current wireless charging mode to the second wireless charging mode.

In some embodiments, the condition for exiting the first wireless charging mode may include, for example, at least one of a disconnection signal (for example, a signal that is set to low level and transmitted through the IDT_connect pin illustrated in FIG. 3) being received, a battery of the device to be charged 13 being fully charged (for example, the device to be charged 13 can feed back a current capacity of the battery to the control module 104 through a second control module 135, and therefore the control module 104 obtains the information that the battery is fully charged), or a charging current of the device to be charged 13 (the charging current may be, for example, the charging current of the battery fed back by the device to be charged 13 through communication with the control module 104, or may also be an output current of the wireless transmitting circuit 108) being smaller than a second preset current value.

The control module 104 periodically detects whether the disconnection signal is received. The signal being received indicates that a wireless connection between the device to be charged and the wireless charging apparatus 10 is disconnected or the device to be charged is removed from the wireless charging apparatus 10. At this time, the wireless charging apparatus 10 is restored to a standard wireless charging mode. That is, when the disconnection signal is received, it is considered that the condition for exiting the first wireless charging mode has occurred.

The control module 104 determines the type of the power supply apparatus 11 by communicating with the power supply apparatus 11. In some embodiments, after the wireless charging apparatus 10 is connected to the power supply apparatus 11 through a cable, the control module 104 detects whether a current port of the charging interface 102 is a standard downstream port (SDP). The control module 104 can determine whether the current port is the SDP, for example, through the BC1.2 identification protocol. A pull-down resistor with a preset resistance (such as 15 kΩ) is provided on the D+ and D− lines of this kind of port, a limit current value of which when suspended may be, for example, 2.5 mA, a limit current value of which when connected may be, for example, 100 mA, and a limit current value when connected and configured to be with a higher power may be, for example, 500 mA. If the current port is the SDP, it means that the power supply apparatus 11 connected to the wireless charging apparatus 10 is an electronic device such as a computer, rather than a device such as a power adapter or a mobile power supply. In response to detecting that the current port is not the standard downlink port, referring to FIG. 3, a load 110 is turned on. For example, the control module 104 transmits a load control signal to the load 110 through a vooc_act pin to load the load 110. At the same time, the control module 104 transmits a first charging mode request to the power supply apparatus 11 and waits for a first charging mode response returned by the power supply apparatus 11. The control module 104 determines the power supply apparatus 11 to be of the first type or of the second type in accordance with an information header of data frames transmitted from the power supply apparatus 11 when the first charging mode response returned by the power supply apparatus is detected within a preset time period (e.g., 1 second). For example, if the received information header of the data frame is set to 101, the power supply apparatus 11 is determined to be of the second type; and if the received information header of the data frame is set to 100, the power supply apparatus 11 is determined to be of the first type. If the control module 104 does not detect the first charging mode response within the preset time period, the power supply apparatus 11 is determined to be of the third type.

In some embodiments, the first charging mode request may include, for example, a request that the power supply apparatus 11 provide an output current greater than a first preset current value (for example, 200 mA) and a first preset number (for example, 30) of square wave signals be transmitted to the power supply apparatus 11.

In some embodiments, the first charging mode response may include, for example, a current on the load 110 being greater than the above-mentioned first preset current value (e.g., the above-mentioned 200 mA) and rising edge interrupt signals of a quantity greater than a second preset number (for example, 19) being received.

In addition, as illustrated in FIG. 1 and FIG. 3, the wireless charging apparatus 10 may further include a voltage converting module 106, which may be implemented as, for example, a Booster voltage regulator in practical applications. The control module 104 may, for example, transmits instructions to the voltage converting module 106 through the two pins DAC and Booster_en as illustrated in FIG. 3.

The voltage converting module 106 is further electrically connected to the charging interface 102 and the wireless transmitting circuit 108 respectively, that is, the voltage converting module 106 is connected between the charging interface 102 and the wireless transmitting circuit 108. When in the first wireless charging mode, the voltage converting module 106 is activated through a second enable signal (e.g., the enable signal transmitted through the Booster_en pin illustrated in FIG. 3) transmitted from the control module 104; and is configured to adjust an output voltage provided to the wireless transmitting circuit 108 in accordance with a voltage adjustment signal (e.g., the signal transmitted through the DAC pin illustrated in FIG. 3) transmitted from the control module 104. If the wireless charging apparatus 10 exits from the first wireless charging mode, the control module 104 will generate a reset signal (for example, transmitted through the Booster_en pin illustrated in FIG. 3), and turn off the voltage converting module 106.

In order to determine an output voltage adjustment value of the voltage converting module 106, the control module 104 is further configured to periodically detect a voltage adjustment value fed back by the device to be charged 13, determine, in accordance with the voltage adjustment value, an adjustment value of the output voltage of the wireless transmitting circuit 108, and transmit the adjustment value to the voltage converting module 106 through a voltage adjustment signal.

In some embodiments, the voltage adjustment value fed back by the device to be charged 13 may be, for example, a difference (CEP) between a target output voltage value Vtarget corresponding to a current charging stage detected by the device to be charged 13 and an actual output voltage value Vact of the wireless receiving circuit 131 in the device to be charged 13.

The current charging stage can be, for example, a trickle charging stage, a constant current charging stage, a constant voltage charging stage, or a supplementary charging stage. In the trickle charging stage, a fully discharged battery is first precharged (that is, restorative charging), and a trickle charging current is usually one-tenth of a current of the constant current charging, and when a battery voltage rises to or above a trickle charging voltage threshold, a charging current is increased and the constant current charging stage is entered. In the constant current charging stage, the battery is charged with a constant current, the charging voltage rises rapidly, and when the charging voltage reaches an expected charging voltage threshold of the battery, the constant voltage charging stage is entered. In the constant voltage charging stage, the battery is charged with a constant voltage, the charging current gradually decreases, and when the charging current drops to a set current threshold (the current threshold is usually several tens of times smaller than a charging current value in the constant current charging stage or lower, and optionally, the current threshold can be tens of milliamps or smaller), the battery is fully charged. After the battery is fully charged, loss of a part of the current will occur due to the influence of self-discharge of the battery. At this time, the supplementary charging stage is entered. In the supplementary charging stage, the charging current is very small, which is just to ensure that the battery is in the fully charged condition.

Hereinafter, in connection with FIG. 2, how the device to be charged 13 detects the actual output voltage value Vact of the wireless receiving circuit 131 will be specifically described.

The device to be charged 13 includes: the wireless receiving circuit 131, the first voltage converting circuit 132, a battery 133, a first charging channel 134, the second control module 135, and a detection circuit 136.

The wireless receiving circuit 131 is configured to receive the electromagnetic signal (or the electromagnetic wave) transmitted from the wireless transmitting circuit 108 and convert the electromagnetic signal (or the electromagnetic wave) into a direct current outputted by the wireless receiving circuit 131. For example, the wireless receiving circuit 131 may include: a receiving coil or a receiving antenna, and a shaping circuit such as a rectifier circuit and/or a filter circuit connected to the receiving coil or the receiving antenna. The wireless receiving circuit 131 converts the electromagnetic signal (or the electromagnetic wave) transmitted from the wireless transmitting circuit 108 into an alternating current through the receiving coil or the receiving antenna, and rectifies and/or filters the alternating current through the shaping circuit, thereby converting the alternating current into a stable direct current to charge the battery 133.

It should be noted that the embodiment of the present disclosure does not specifically limit the specific form of the shaping circuit and the forms of an output voltage and an output current of the wireless receiving circuit 131 obtained after being shaped by the shaping circuit.

The battery 133 may include a single cell or a plurality of cells. When the battery 133 includes a plurality of cells, the plurality of cells may be connected in series. As a result, a charging voltage that the battery 133 can withstand is a sum of the charging voltages that the plurality of cells can withstand, which can increase the charging speed and reduce charging heat.

For example, taking the device to be charged 13 as a mobile phone as an example, when the battery 133 of the device to be charged 13 includes a single cell, a voltage of the internal single cell is generally between 3.0V and 4.35V. When the battery 133 of the device to be charged 13 includes two cells connected in series, a total voltage of the two cells connected in series is 6.0V to 8.7V. Therefore, compared with a single cell, when a plurality of cells are connected in series, the output voltage of the wireless receiving circuit 131 can be increased. Compared with a single cell, to achieve the same charging speed, a charging current required by a plurality of cells is about 1/N (N is the number of cells connected in series in the device to be charged 13) of a charging current required by a single cell. In other words, under the premise of ensuring the same charging speed (the same charging power), adopting the solution of a plurality of cells can reduce the size of the charging current, thereby reducing the heat generated by the device to be charged 13 during the charging process. On the other hand, compared with the solution of a single cell, under the condition that the charging current remains the same, adopting the solution of a plurality of cells connected in series can increase the charging voltage, thereby increasing the charging speed.

The detection circuit 136 is configured to detect a voltage value and/or a current value on the first charging channel 134. The voltage value and/or the current value on the first charging channel 134 may refer to a voltage value and/or a current value between the first voltage converting circuit 132 and the battery 133, that is, an output voltage and/or an output current of the first voltage converting circuit 132. The output voltage and/or the output current are directly loaded to the battery 133 to charge the battery 133. Alternatively, the voltage value and/or the current value on the first charging channel 134 may refer to a voltage value and/or a current value between the wireless receiving circuit 131 and the first voltage converting circuit 132, that is, an output voltage value and/or an output current value of the wireless receiving circuit 131.

Therefore, the output voltage of the wireless receiving circuit 131, that is, the voltage value between the wireless receiving circuit 131 and the first voltage converting circuit 132, can be detected through the detection circuit 136 described above.

The second control module 135 may be implemented by, for example, an independent MCU, or may be implemented by an application processor (AP) inside the device to be charged 13. The second control module 135 is configured to communicate with the control module 104 in the wireless charging apparatus 10 to feed back the above-mentioned difference CEP to the control module 104 in the wireless charging apparatus 10. The communication between the device to be charged 13 and the wireless charging apparatus 10 may be conducted in a manner described above, which will not be repeated here.

In addition, after the current wireless charging mode is adjusted to the second wireless charging mode, as described above, the control module 104 further turns off the voltage converting module 106 through the above-mentioned second enable signal. In addition, through communication with the power supply apparatus 11, the control module 104 reset the power supply apparatus to cause the charging mode of the power supply apparatus 11 to be set in the second charging mode, that is, cause the power supply apparatus 11 of the first type or the second type to return to operate in the second charging mode, e.g., to provide electric energy of 5V/2.3 A.

According to the wireless charging apparatus provided by the embodiments of the present disclosure, through a control process, the adaptation of the charging mode between the device to be charged and the power supply device can be quickly coordinated to cause the device to be charged to quickly enter a fast wireless charging mode (e.g., the above-mentioned first wireless charging mode) and increase the charging speed of the device to be charged. In addition, in the fast wireless charging mode, whether conditions for exiting the fast wireless charging mode has occurred is detected periodically. Once these conditions occur, a standard wireless charging mode is immediately returned to, therefore avoiding a waste of electric energy due to high output power.

It should be clearly understood that the present disclosure describes how to form and use specific examples, but the principles of the present disclosure are not limited to any details of these examples. On the contrary, based on the teaching of the contents of the present disclosure, these principles can be applied to many other embodiments.

It should be noted that the block diagrams shown in the above figures are functional entities and do not necessarily correspond to physically or logically independent entities. These functional entities can be implemented in the form of software, or implemented in one or more hardware modules or integrated circuits, or implemented in different networks and/or processor devices and/or microcontroller devices.

Hereinafter, the method embodiments of the present disclosure are described, which can be applied to the above-mentioned apparatus embodiments. For details that are not disclosed in the method embodiments of the present disclosure, please refer to the apparatus embodiments of the present disclosure.

Figure 4:
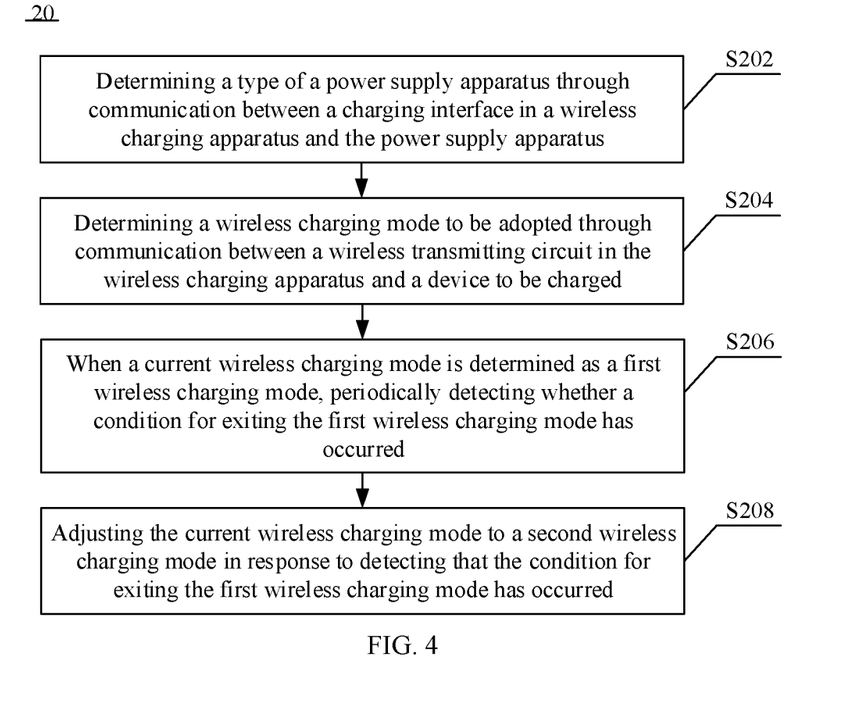
FIG. 4 illustrates a flow chart of a wireless charging method according to an exemplary embodiment.

FIG. 4 illustrates a flow chart of a wireless charging method according to an exemplary embodiment.

The wireless charging method 20 illustrated in FIG. 4, for example, can be applied to the above-mentioned wireless charging apparatus 10, and specifically can be executed by the control module 104 in the wireless charging apparatus 10.

Referring to FIG. 4, the wireless charging method 20 includes the following steps.

In step 202, a type of a power supply apparatus is determined through communication between a charging interface in the wireless charging apparatus and the power supply apparatus.

When the electric energy provided by the power supply apparatus is received, the wireless transmitting circuit is activated by transmitting a first enable signal to the wireless transmitting circuit in the wireless charging apparatus.

The control module 104 further determines the type of the power supply apparatus through communication between the charging interface in the wireless charging apparatus and the power supply apparatus.

In some embodiments, the types of the power supply apparatuses include: a first type, a second type, and a third type. A maximum output power of the power supply apparatus of the first type is greater than a maximum output power of the power supply apparatus of the second type, and the maximum output power of the power supply apparatus of the second type is greater than a maximum output power of the power supply apparatus of the third type.

The charging modes of the power supply apparatus of the first type and the power supply apparatus of the second type include: a first charging mode and a second charging mode. The power supply apparatus of the first type has a greater output power in the first charging mode than in the second charging mode, and the power supply apparatus of the second type has a greater output power in the first charging mode than in the second charging mode.

The charging mode of the power supply apparatus of the third type includes: a second charging mode.

In step 204, a wireless charging mode to be adopted is determined through communication between the wireless transmitting circuit in the wireless charging apparatus and the device to be charged.

The wireless charging mode is a first wireless charging mode or a second wireless charging mode, and the wireless transmitting circuit has a greater output power in the first wireless charging mode than in the second wireless charging mode.

In some embodiments, in order to ensure the matching between the wireless charging mode and the charging mode, the method 20 further includes: requesting a power supply apparatus to operate in the first charging mode when a first wireless charging mode request transmitted from the device to be charged is received, and the power supply apparatus is of the first type or of the second type. When the power supply apparatus operates in the first charging mode, the electric energy outputted from the power supply apparatus has a power greater than the charging power required for the wireless charging apparatus in the first wireless charging mode.

In step 206, when a current wireless charging mode is determined as the first wireless charging mode, whether a condition for exiting the first wireless charging mode has occurred is periodically detected.

In step 208, the current wireless charging mode is adjusted to the second wireless charging mode in response to detecting that the condition for exiting the first wireless charging mode has occurred.

In some embodiments, the condition for exiting the first wireless charging mode includes at least one of: a disconnection signal being received, a battery of the device to be charged being fully charged, or a charging current of the device to be charged being smaller than a second preset current value.

According to the wireless charging method provided by the embodiments of the present disclosure, through a control process, the adaptation of the charging mode between the device to be charged and the power supply device can be quickly coordinated to cause the device to be charged to quickly enter a fast wireless charging mode (e.g., the above-mentioned first wireless charging mode) and increase the charging speed of the device to be charged. In addition, in the fast wireless charging mode, whether conditions for exiting the fast wireless charging mode have occurred is detected periodically. Once these condition occur, a standard wireless charging mode is immediately returned to, therefore avoiding a waste of electric energy due to high output power.

Figure 5:
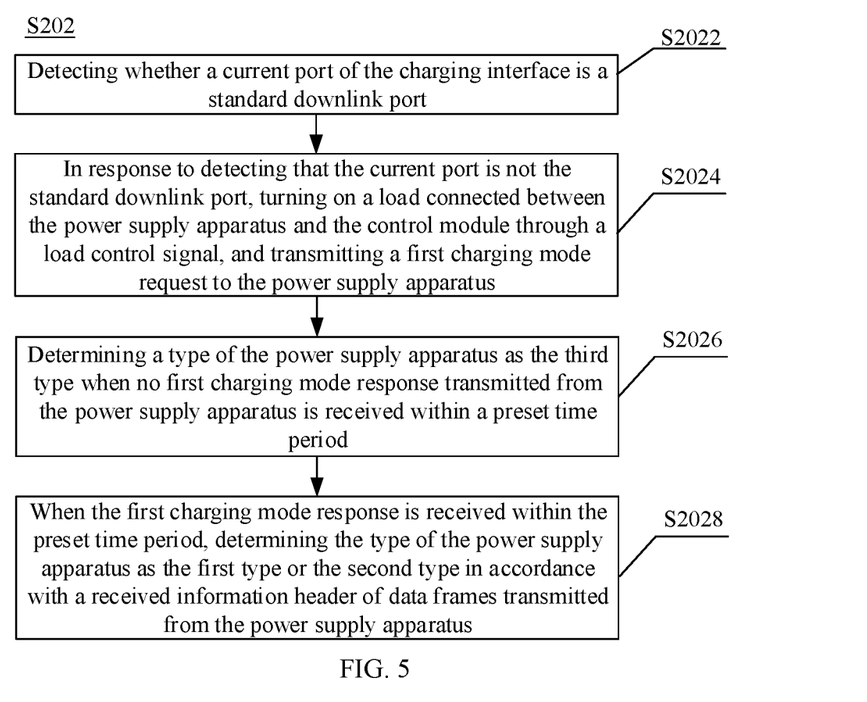
FIG. 5 illustrates a flow chart of another wireless charging method according to an exemplary embodiment.

FIG. 5 illustrates a flow chart of another wireless charging method according to an exemplary embodiment. The difference from the wireless charging method 20 illustrated in FIG. 4 is that the wireless charging method shown in FIG. 5 further provides an embodiment of how to determine the type of the power supply apparatus through the charging interface in the wireless charging apparatus.

Referring to FIG. 5, step 202 illustrated in FIG. 4 further includes the following steps.

In step 2022, whether a current port of the charging interface is a standard downlink port is detected.

In step 2024, in response to detecting that the current port is not the standard downlink port, a load connected between the power supply apparatus and the control module is turned on through a load control signal, and a first charging mode request is transmitted to the power supply apparatus.

In some embodiments, the first charging mode request includes: requesting the power supply apparatus to provide an output current greater than a first preset current value and requesting transmission of a first preset number of square wave signals to the power supply apparatus.

In step 2026, a type of the power supply apparatus is determined as the third type when no first charging mode response transmitted from the power supply apparatus is received within a preset time period.

In some embodiments, the first charging mode response includes: a current of the load being greater than the first preset current value and rising edge interrupt signals of a quantity greater than a second preset number being received.

In step 2028, when the first charging mode response is received within the preset time period, the type of the power supply apparatus is determined as the first type or the second type in accordance with the received information header of data frames transmitted from the power supply apparatus.

Figure 6:
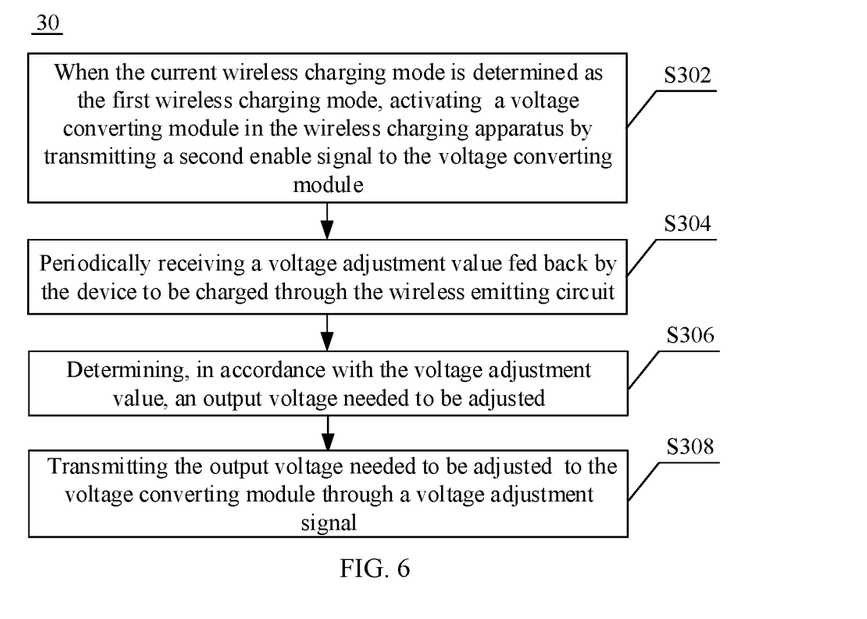
FIG. 6 illustrates a flow chart of yet another wireless charging method according to an exemplary embodiment.

FIG. 6 illustrates a flow chart of yet another wireless charging method according to an exemplary embodiment. The difference from the method 20 shown in FIG. 4 is that the method shown in FIG. 6 further provides how to activate the voltage converting module in the first wireless charging mode, and how to adjust the output voltage of the wireless transmitting circuit through the voltage converting module in accordance with the feedback of the device to be charged.

Referring to FIG. 6, based on the method 20, the method 30 may further include the following steps.

In step 302, when the current wireless charging mode is determined as the first wireless charging mode, a voltage converting module in the wireless charging apparatus is activated by transmitting a second enable signal to the voltage converting module.

In step 304, a voltage adjustment value fed back by the device to be charged is periodically received through the wireless transmitting circuit.

In step 306, an output voltage needed to be adjusted is determined in accordance with the voltage adjustment value.

In step 308, the output voltage needed to be adjusted is transmitted to the voltage converting module through a voltage adjustment signal.

In some embodiments, the method 30 may further include: after adjusting the current wireless charging mode to the second wireless charging mode, turning off the voltage converting module through the second enable signal, and resetting the power supply apparatus through communication with the power supply apparatus to cause the power supply apparatus to be set in the second charging mode.

In addition, it should be noted that the above-mentioned drawings are only schematic illustrations of the processings included in the method according to the exemplary embodiment of the present disclosure, and are not intended for limitation. It is easy to understand that the processings shown in the above drawings do not indicate or limit the time sequence of these processings. In addition, it is easy to understand that these processings can be executed synchronously or asynchronously in multiple modules, for example.

The exemplary embodiments of the present disclosure are specifically shown and described above. It should be understood that the present disclosure is not limited to the detailed structures, arrangement manners or implementation methods described herein; on the contrary, the present disclosure intends to cover various modifications and equivalent arrangements included in the essence and scope of the appended claims.

What is claimed is:

1. A wireless charging apparatus, comprising:
a charging interface;
a wireless transmitting circuit configured to convert electric energy received through the charging interface and outputted from a power supply apparatus into an electromagnetic signal and transmit the electromagnetic signal to wirelessly charge a device to be charged; and
a control module electrically connected to the charging interface and the wireless transmitting circuit respectively and configured to: determine a type of the power supply apparatus through communication between the charging interface in the wireless charging apparatus and the power supply apparatus, and determine, based on the determined type of the power supply apparatus, a wireless charging mode to be adopted through communication between the wireless transmitting circuit and the device to be charged,
wherein the wireless charging mode is a first wireless charging mode or a second wireless charging mode, wherein an output power of the wireless transmitting circuit in the first wireless charging mode is greater than an output power of the wireless transmitting circuit in the second wireless charging mode, and
wherein the control module is further configured to, in the first wireless charging mode, periodically detect whether a condition for exiting the first wireless charging mode has occurred, and adjust a current wireless charging mode to the second wireless charging mode in response to detecting that the condition for exiting the first wireless charging mode has occurred.

2. The wireless charging apparatus according to claim 1, wherein the control module is further configured to: request the power supply apparatus to operate in the first charging mode in response to receiving a first wireless charging mode request transmitted from the device to be charged and when the power supply apparatus is of a first type or of a second type, and
wherein a maximum output power of the power supply apparatus of the first type is greater than a maximum output power of the power supply device of the second type; and when the power supply apparatus operates in the first charging mode, and the electric energy outputted from the power supply apparatus has a power greater than or equal to a charging power required for the first wireless charging mode.

3. The wireless charging apparatus according to claim 2, wherein the control module is further configured to: detect whether a current port of the charging interface is a standard downlink port; in response to detecting that the current port is not the standard downlink port, turn on a load connected between the power supply apparatus and the control module through a load control signal, and transmit a first charging mode request to the power supply apparatus; and determine the power supply apparatus to be of the first type or of the second type in accordance with a received information header of data frames transmitted from the power supply apparatus when a first charging mode response is received within a preset time period.

4. The wireless charging apparatus according to claim 3, wherein the first charging mode request comprises: requesting the power supply apparatus to provide an output current greater than a first preset current value and requesting transmission of a first preset number of square wave signals to the power supply apparatus.

5. The wireless charging apparatus according to claim 4, wherein the first charging mode response comprises: a current of the load being greater than the first preset current value and rising edge interrupt signals of a quantity greater than a preset second number being received.

6. The wireless charging apparatus according to claim 1, further comprises a voltage converting module electrically connected to the wireless transmitting circuit, the control module, and the charging interface respectively, wherein in the first wireless charging mode, the voltage converting module is activated by a second enable signal transmitted from the control module; and wherein the voltage converting module is configured to adjust an output voltage provided to the wireless transmitting circuit in accordance with a voltage adjustment signal transmitted from the control module.

7. The wireless charging apparatus according to claim 6, wherein the control module is further configured to: periodically receive a voltage adjustment value fed back by the device to be charged through the wireless transmitting circuit; determine, in accordance with the voltage adjustment value, an output voltage needed to be adjusted; and transmit the output voltage needed to be adjusted to the voltage converting module through the voltage adjustment signal.

8. The wireless charging apparatus according to claim 6, wherein the control module is further configured to: turn off the voltage converting module through the second enable signal after adjusting the current wireless charging mode to the second wireless charging mode, and reset the power supply apparatus through communication with the power supply apparatus to cause the power supply apparatus to be set in the second charging mode.

9. The wireless charging apparatus according to claim 1, wherein the condition for exiting the first wireless charging mode comprises at least one of: a disconnection signal being received, a battery of the device to be charged being fully charged, or a charging current of the device to be charged being smaller than a second preset current value.

10. A wireless charging method applicable to a wireless charging apparatus, comprising:
    determining a type of a power supply apparatus through communication between a charging interface in the wireless charging apparatus and the power supply apparatus; and determining, based on the determined type of the power supply apparatus, a wireless charging mode to be adopted through communication between a wireless transmitting circuit in the wireless charging apparatus and a device to be charged, wherein the wireless charging mode is a first wireless charging mode or a second wireless charging mode, and an output power of the wireless transmitting circuit in the first wireless charging mode is greater than an output power of the wireless transmitting circuit in the second wireless charging mode;
    when a current wireless charging mode is determined as the first wireless charging mode, periodically detecting whether a condition for exiting the first wireless charging mode has occurred; and
    adjusting the current wireless charging mode to the second wireless charging mode in response to detecting that the condition for exiting the first wireless charging mode has occurred.

11. The method according to claim 10, further comprising:
    requesting the power supply apparatus to operate in the first charging mode in response to receiving a first wireless charging mode request transmitted from the device to be charged and when the power supply apparatus is of a first type or of a second type,
    wherein a maximum output power of the power supply apparatus of the first type is greater than a maximum output power of the power supply device of the second type; and when the power supply apparatus operates in the first charging mode, electric energy outputted from the power supply apparatus has a power greater than or equal to a charging power required for the first wireless charging mode.

12. The method according to claim 11, wherein said determining the type of the power supply apparatus through the communication between the charging interface in the wireless charging apparatus and the power supply apparatus further comprises:
    detecting whether a current port of the charging interface is a standard downlink port;
    in response to detecting that the current port is not the standard downlink port, turning on a load connected between the power supply apparatus and the control module through a load control signal, and transmitting a first charging mode request to the power supply apparatus; and
    when a first charging mode response is received within a preset time period, determining the type of the power supply apparatus as the first type or the second type in accordance with a received information header of data frames transmitted from the power supply apparatus.

13. The method according to claim 12, wherein the first charging mode request comprises: requesting the power supply apparatus to provide an output current greater than a first preset current value and requesting transmission of a first preset number of square wave signals to the power supply apparatus.

14. The method according to claim 13, wherein the first charging mode response comprises: a current of the load being greater than the first preset current value and rising edge interrupt signals of a quantity greater than a second preset number being received.

15. The method according to claim 10, further comprising:
    when the current wireless charging mode is determined as the first wireless charging mode, activating a voltage converting module in the wireless charging apparatus by transmitting a second enable signal to the voltage converting module.

16. The method according to claim 15, further comprising:
    periodically receiving a voltage adjustment value fed back by the device to be charged through the wireless transmitting circuit;
    determining, in accordance with the voltage adjustment value, an output voltage needed to be adjusted; and
    transmitting the output voltage needed to be adjusted to the voltage converting module through a voltage adjustment signal.

17. The method according to claim 15, further comprising:
    after adjusting the current wireless charging mode to the second wireless charging mode, turning off the voltage converting module through the second enable signal, and resetting the power supply apparatus through communication with the power supply apparatus to cause the power supply apparatus to be set in the second charging mode.

18. A wireless charging system, comprising:
the wireless charging apparatus according to claim 1;
a device to be charged; and
a power supply apparatus, wherein the wireless charging apparatus is configured to convert inputted electric energy into an electromagnetic signal and transmit the electromagnetic signal to wirelessly charge the device to be charged; and the power supply apparatus is configured to provide the inputted electric energy to the wireless charging apparatus.

19. The wireless charging apparatus according to claim 2, wherein the control module is further configured to: detect whether a current port of the charging interface is a standard downlink port; in response to detecting that the current port is not the standard downlink port, turn on a load connected between the power supply apparatus and the control module through a load control signal, and transmit a first charging mode request to the power supply apparatus; and determine the power supply apparatus to be of a third type when no first charging mode response transmitted from the power supply apparatus is received within a preset time period, wherein both the maximum output power of the power supply apparatus of the first type and the maximum output power of the power supply apparatus of the second type are greater than a maximum output power of the power supply apparatus of the third type.

20. The method according to claim 11, wherein said determining the type of the power supply apparatus through the communication between the charging interface in the wireless charging apparatus and the power supply apparatus further comprises:
detecting whether a current port of the charging interface is a standard downlink port;
in response to detecting that the current port is not the standard downlink port, turning on a load connected between the power supply apparatus and the control module through a load control signal, and transmitting a first charging mode request to the power supply apparatus; and
determining the type of the power supply apparatus as a third type when no first charging mode response transmitted from the power supply apparatus is received within a preset time period,
wherein both the maximum output power of the power supply apparatus of the first type and the maximum output power of the power supply apparatus of the second type are greater than a maximum output power of the power supply apparatus of the third type.

\* \* \* \* \*